May 20, 1958    W. C. STOESSER ET AL    2,835,707
PROCESS FOR MAKING META-CHLOROPHENOL
Filed April 23, 1956
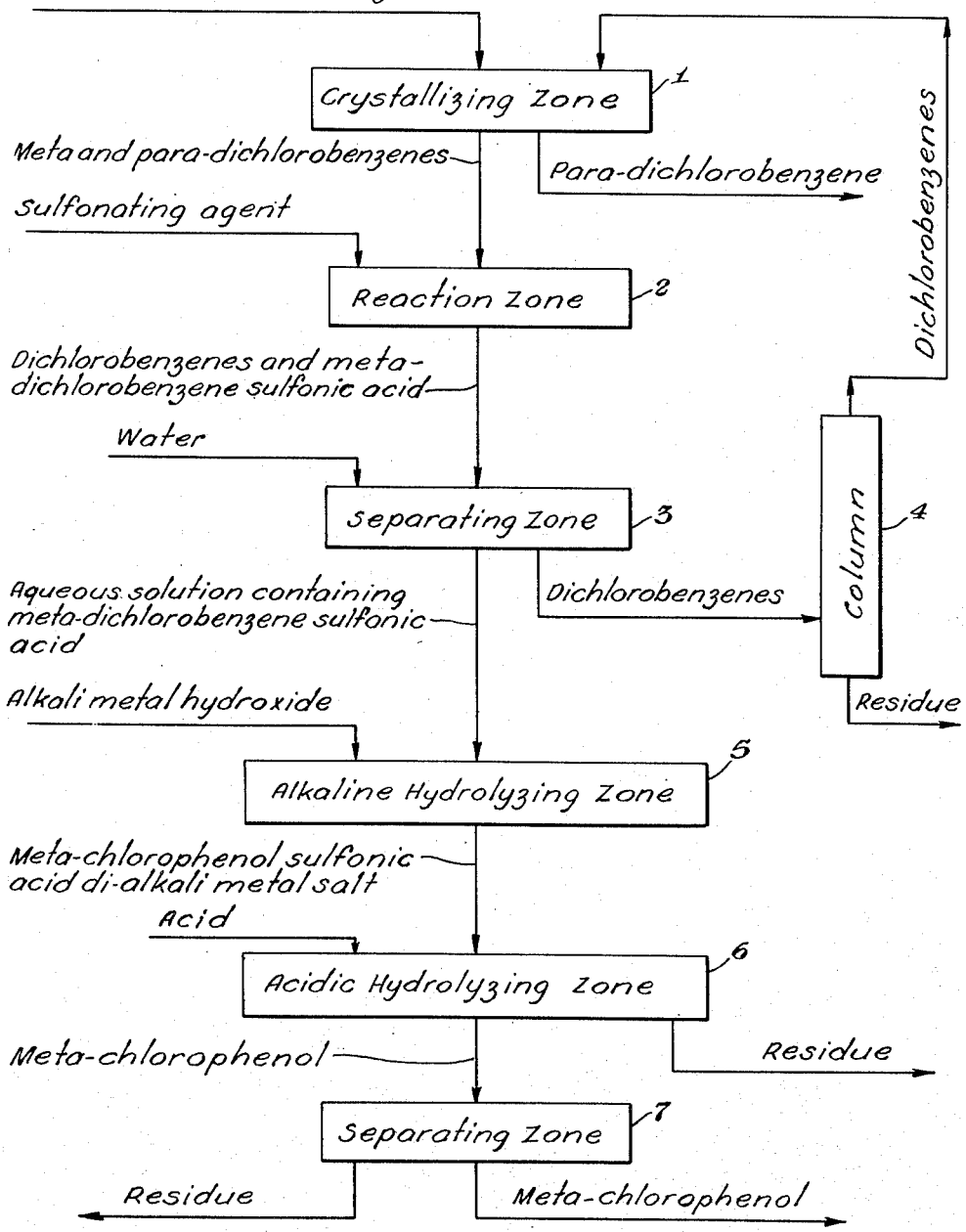
INVENTORS.
Wesley C. Stoesser
BY Willard M. Gentry
Griswold & Burdick
ATTORNEYS United States Patent Office 2,835,707
Patented May 20, 1958

2,835,707

PROCESS FOR MAKING META-CHLOROPHENOL

Wesley C. Stoesser and Willard M. Gentry, Midland, Mich., assignors to The Dow Chemical Company, Midland, Mich., a corporation of Delaware Application April 23, 1956, Serial No. 579,936

9 Claims. (Cl. 260—623)

This invention concerns a process for making meta-chlorophenol from meta-dichlorobenzene. It relates more particularly to an integrated process for separating meta- and para-dichlorobenzenes from one another and converting of the meta-dichlorobenzene into meta-chlorophenol.

In the manufacture of dichlorobenzenes from chlorine and benzene the isomeric ortho-, meta- and para-dichlorobenzenes are obtained in varying proportions. The ortho- and para-isomers are usually present in predominant amount, together with a minor amount of the meta-isomer. The separation and recovery of a mixture of the meta- and para-dichlorobenzenes from the ortho-dichlorobenzene is effected by distillation of a mixture of the isomeric dichlorobenzenes to obtain the meta- and para-dichlorobenzenes as distillate. Para-dichlorobenzene is recovered by cooling the distillate of meta- and para-dichlorobenzenes to temperatures of 50° C. or lower whereby a portion of the para-dichlorobenzene is crystallized and is separated from the liquid material. The mother liquor remaining after separating the crystalline para-dichlorobenzene consists principally of a mixture of the meta- and para-dichlorobenzenes, which compounds cannot be separated from one another by fractional distillation because their boiling points are nearly the same. The compounds cannot be separated completely from one another by crystallization because of the formation of a eutectic of the meta- and para-dichlorobenzenes. In the production of ortho- and para-dichlorobenzenes from chlorine and benzene on a commercial scale, the eutectic or a mixture of the meta-dichlorobenzene and the para-dichlorobenzene isomers is obtained as a by-product for which there is little or no demand.

It is a primary object of the invention to provide a process for making meta-chlorophenol from meta-dichlorobenzene. Another object is to provide an integrated process which involves separating meta- and para-dichlorobenzenes from one another and converting of the meta-dichlorobenzene into meta-chlorophenol. A further object is to provide a process for making meta-chlorophenol from a low cost material comprising essentially a mixture of isomeric meta- and para-dichlorobenzenes with recovery of the para-dichlorobenzene. Other and related objects may appear from the following description of the invention.

According to the invention meta-chlorophenol can readily be obtained in good yield by a procedure which involves reacting meta-dichlorobenzene with a sulfonating agent to obtain the corresponding meta-dichlorobenzene sulfonic acid, converting the latter to a salt, e. g. by treatment with an alkali metal hydroxide, heating the salt in admixture with an aqueous solution of an alkali metal hydroxide at elevated temperatures and pressures whereby a chlorine atom is replaced by an hydroxyl group or a metaloxy group to obtain meta-chlorophenol sulfonate or a salt thereof, and heating the meta-chlorophenol sulfonate in admixture with an aqueous acidic solution of a strong mineral acid such as sulfuric acid, hydrochloric acid or hydrobromic acid at elevated temperatures with the resultant formation of meta-chlorophenol.

In its practical applications the method is more particularly associated with a process for the production of dichlorobenzenes from chlorine and benzene wherein a mixture of isomeric dichlorobenzenes is subjected to fractional distillation to obtain a mixture consisting principally of meta- and para-dichlorobenzenes as distillate, thereby separating these isomers from the higher boiling ortho-dichlorobenzene, and wherein the distillate consisting essentially of meta- and para-dichlorobenzenes is cooled, e. g. to temperatures between 50° and —25° C., to crystallize at least a portion of the para-dichlorobenzene and the crystalline product is separated from the liquid material in usual ways such as by centrifuging or filtering. The liquid filtrate or mother liquor comprising essentially a mixture of meta- and para-dichlorobenzbenes is reacted with a sulfonating agent under conditions permitting the preferential sulfonation of the meta-dichlorobenzene to obtain meta-dichlorobenzene sulfonic acid. The sulfonated and unsulfonated dichlorobenzenes are separated. The latter, principally para-dichlorobenzene, is purified, suitably by a flash distillation, and is recycled to the crystallizing step in the process to recover a further quantity of the para-dichlorobenzene. The sulfonated dichlorobenzene, principally meta-dichlorobenzene sulfonic acid, is converted to a salt, e. g. by treatment with an aqueous solution of an alkali metal hydroxide. The salt is subjected to alkaline hydrolysis by heating the same in admixture with an aqueous solution of an alkali metal hydroxide at elevated temperatures and pressures to obtain meta-chlorophenol sulfonic acid dialkali metal salt. The meta-chlorophenol sulfonic acid dialkali metal salt is heated in admixture with an acidic aqueous solution of sulfuric acid, hydrochloric acid or hydrobromic acid at elevated temperatures to obtain meta-chlorophenol.

The invention will be described more particularly with reference to the accompanying drawing, showing a diagrammatic flow sheet for the process.

The method of the present invention comprises the introduction of a mixture of meta- and para-dichlorobenzenes into a crystallizing zone 1 wherein the mixture is cooled, e. g. to temperatures between 50° and —25° C., to crystallize at least a portion of the para-dichlorobenzene. The crystallized para-dichlorobenzene is separated from the mother liquor and is withdrawn from zone 1. The mother liquor containing meta-dichlorobenzene is withdrawn from zone 1 and is fed to a reaction zone 2. A sulfonating agent, preferably sulfur trioxide, is fed to reaction zone 2 and is reacted with the meta-dichlorobenzene. The material containing the sulfonated dichlorobenzenes is withdrawn from reaction zone 2 and is fed into admixture with water in a separating zone 3. After standing, the aqueous solution of the sulfonated dichlorobenzenes is separated from the organic layer of the unsulfonated dichlorobenzenes. The unsulfonated dichlorobenzenes are withdrawn from separating zone 3 and fed to a distilling column 4 wherein the dichlorobenzenes, principally para-dichlorobenzene, are recovered and are returned to the crystallizing zone 1. The aqueous solution of the sulfonated dichlorobenzenes containing the meta-dichlorobenzene sulfonic acid is withdrawn from separating zone 3 and is fed to an alkaline hydrolyzing zone 5 wherein it is mixed with an alkali metal hydroxide, suitably an aqueous solution of sodium hydroxide, also fed to zone 5. The meta-dichlorobenzene sulfonate is heated in admixture with the aqueous solution of the alkali metal hydroxide at elevated temperatures and pressures in zone 5 and is hydrolyzed to obtain the corresponding meta-chlorophenol sulfonate or a salt thereof, e. g. the meta-chlorophenol sulfonic acid dialkali metal salt. The aqueous hydrolysis solution containing the meta-chlorophenol sulfonic acid dialkali metal salt, is withdrawn from the alkaline hydrolyzing zone 5 and is fed into an acidic hydrolyzing zone 6 and into admixture with sulfuric acid, hydrochloric acid or hydrobromic acid, also fed to said acidic hydrolyzing zone. The resulting acidic mixture is heated at elevated temperatures and the meta-chlorophenol sulfonic acid dialkali metal salt is converted to meta-chlorophenol by the acidic hydrolysis of the sulfonate group. The acidic reacted material containing meta-chlorophenol is withdrawn from zone 6 and is fed to a separating zone 7 wherein the meta-chlorophenol is recovered. The meta-chlorophenol is recovered or separated from the acidic hydrolysis mixture in separating zone 7 in usual ways, e. g. by extraction with a water-immiscible organic solvent such as toluene or chlorobenzene, or by distillation of the meta-chlorophenol from the acidic mixture together with water as hereinafter described.

The invention provides an integrated process which results in substantially complete separation of the meta- and para-dichlorobenzenes from one another, provides improvements in the manufacture of para-dichlorobenzene from chlorine and benzene and provides a process for making meta-chlorophenol from by-product starting materials, i. e. a mixture of meta- and para-dichlorobenzenes.

The sulfonating agent to be employed in the process can be fuming sulfuric acid, chlorosulfonic acid or sulfur trioxide, preferably the latter, and is employed in amount corresponding to from 0.6 to 1, preferably from 0.7 to 0.9, gram molecular proportion of the sulfonating agent per gram molecular proportion of the meta-dichlorobenzene. When employing fuming sulfuric acid as the sulfonating agent said acid is used in amounts corresponding to from 0.6 to 1, preferably from 0.7 to 0.9, gram molecular proportion of $SO_3$ contained therein, based on the formula $H_2SO_4 \cdot XSO_3$, wherein X represents the percent of $SO_3$ above 100 percent sulfuric acid, per gram molecular proportion of the meta-dichlorobenzene.

The dichlorobenzene to be employed as starting material can be meta-dichlorobenzene or a mixture comprised essentially of meta- and para-dichlorobenzenes such as the mother liquor obtained in a process for making dichlorobenzenes from chlorine and benzene, wherein a mixture of isomeric dichlorobenzenes is subjected to fractional distillation to obtain the meta- and para-dichlorobenzenes as distillate and separate them from the ortho-dichlorobenzene and said distillate is cooled to recover at least a portion of the para-dichlorobenzene as a crystalline product. The mother liquor frequently contains a small amount, e. g. 10 percent by weight or less of ortho-dichlorobenzene. Such amount of ortho-dichlorobenzene component in the starting material is not disadvantageous since it, like the meta-dichlorobenzene, reacts more readily with the sulfonating agent to form the corresponding ortho-dichlorobenzene sulfonic acid than does the para-dichlorobenzene. In such instance, the sulfonating agent is employed in amount corresponding to from 0.6 to 1, preferably from 0.7 to 0.9, gram molecular proportion of the sulfonating agent, e. g. sulfur trioxide, per gram molecular equivalent proportion of the sum of the ortho- and meta-dichlorobenzenes in the starting material.

The sulfonating reaction can be carried out at temperatures between 20° and 80° C., preferably from 40° to 60° C., and at atmospheric or superatmospheric pressures.

Upon completing the sulfonating reaction, the mixture is usually diluted with water, suitably with from one to four times its volume or more of water, to facilitate the separation of the sulfonated dichlorobenzenes as an aqueous solution of the same from the unsulfonated dichlorobenzenes, e. g. para-dichlorobenzene.

The sulfonated dichlorobenzene, consisting principally of meta-dichlorobenzene sulfonic acid, is converted to the dichlorobenzene sulfonic acid alkali metal salt and is hydrolyzed by heating the same in admixture with an aqueous solution of an alkali metal hydroxide such as potassium hydroxide or sodium hydroxide in concentrations of from 2 to 25 percent by weight and in amount corresponding to from 2 to 4 gram molecular proportions of the alkali metal hydroxide per gram mole of the dichlorobenzene sulfonic acid alkali metal salt starting material to obtain the corresponding monochlorophenol sulfonic acid dialkali metal salt.

The alkaline hydrolysis to obtain the corresponding monochlorophenol sulfonic acid dialkali metal salt is usually carried out at temperatures between 180° and 240° C. and under a pressure at least as great as the autogeneous pressure of the mixture of the materials. In general, pressures of from 150 to 3000 pounds per square inch are satisfactory.

The monochlorophenol sulfonic acid dialkali metal salt obtained in the alkaline hydrolysis is converted to the corresponding chlorophenol, e. g. meta-chlorophenol, by treatment with an aqueous acidic solution of sulfuric acid, hydrochloric acid or hydrobromic acid at elevated temperatures to replace the sulfonate group with a hydrogen atom.

In general, the acidic treatment or acidic hydrolysis of the sulfonate group can be carried out by mixing the meta-chlorophenol dialkali metal salt or an aqueous solution of the salt with an acid or an aqueous solution of an acid such as hydrochloric acid, hydrobromic acid or sulfuric acid in amount at least sufficient to convert the meta-chlorophenol sulfonic acid dialkali metal salt to the corresponding meta-chlorophenol sulfonate, i. e. the monoalkali metal salt of meta-chlorophenol sulfonic acid, and bring the solution to a pH value of 5 or lower. The meta-chlorophenol sulfonate is heated in admixture with the liquid acidic solution, preferably a liquid aqueous 5 to 70 weight percent solution of sulfuric acid, or an aqueous solution containing at least 5 percent by weight of hydrochloric or hydrobromic acid in amount corresponding to at least 0.5 gram molecular proportion of the acid per gram molecular proportion of the meta-chlorophenol sulfonate, at hydrolysis temperatures between 120° and 250° C. and at atmospheric or superatmospheric pressures, i. e. absolute pressures sufficient to maintain the aqueous solution substantially in liquid condition.

More specifically, the acidic hydrolysis can be carried out by heating the meta-chlorophenol sulfonate in admixture with an aqueous 20 to 70 weight percent solution of sulfuric acid at reaction temperatures between 120° and 250° C., advantageously at from 140° to 160° C. at pressures sufficient to maintain a major portion of the aqueous reaction mixture in liquid form. The acidic hydrolysis is preferably carried out employing an aqueous 50 to 70 weight percent solution of sulfuric acid and reaction temperatures of from 120 to 160° C., in which case the hydrolysis can be carried out at atmospheric pressure or thereabout. When employing the sulfuric acid in concentrations between 5 and about 20 percent by weight and the water in the aqueous reaction mixture, or hydrochloric acid or hydrobromic acid, preferably in concentrations of from 5 to 20 percent by weight, the acidic hydrolysis can be effected by heating the meta-chlorophenol sulfonate in admixture with the aqueous acidic solution at hydrolysis temperatures between about 160° and 220° C. under pressure. A pressure at least as great as the autogenous pressure of the mixture is satisfactory but higher pressures can be used, e. g. pressures of from 90 to 500 pounds per square inch gauge pressure. In all such acidic hydrolysis methods the aqueous acidic medium is employed in an amount sufficient to form a solution or slurry with the meta-chlorophenol sulfonate which can conveniently be agitated or stirred, e. g. in an amount of from one to ten grams of acidic solution per gram of the meta-chlorophenol sulfonate.

The aqueous alkaline hydrolysis reaction mixture containing the meta-chlorophenol sulfonic acid dialkali metal salt, obtained by the alkaline hydrolysis of the meta-dichlorobenzene sulfonic acid alkali metal salt, can be fed to a reaction zone and into admixture with an aqueous 50 to 70 weight percent solution of sulfuric acid also fed to said reaction zone, wherein the mixture is maintained at temperatures between 140° and 160° C. at atmospheric or substantially atmospheric pressure to effect the acidic hydrolysis of the sulfonate group, and distilling the meta-chlorophenol, together with water from the acidic mixture as it is formed.

The meta-chlorophenol sulfonic acid dialkali metal salt can be separated from the aqueous alkaline hydrolysis reaction mixture in which it is prepared, then heated in admixture with an aqueous solution of sulfuric acid, hydrochloric acid or hydrobromic acid as herein described to obtain meta-chlorophenol, if desired. The meta-chlorophenol sulfonate can readily be separated from the aqueous alkaline hydrolysis reaction mixture in which the meta-chlorophenol sulfonic acid dialkali metal salt is prepared by treating the alkaline solution with an acid such as hydrochloric acid, hydrobromic acid or sulfuric acid in amount sufficient to convert the dialkali metal salt to meta-chlorophenol sulfonate, i. e. meta-chlorophenol sulfonic acid monoalkali metal salt. The latter compound precipitates and can be separated from the liquid material by filtering.

The acidic hydrolysis of the meta-chlorophenol sulfonic acid or monoalkali metal salt thereof, to replace the sulfonate group with a hydrogen atom and form meta-chlorophenol is usually carried out by mixing the aqueous alkaline hydrolysis reaction mixture containing the meta-chlorophenol sulfonic acid dialkali metal salt and the by-product alkali metal salt formed in the reaction, together with unconsumed alkali metal hydroxide, with an acid such as hydrochloric acid, hydrobromic acid or sulfuric acid in amount sufficient to react with and neutralize the alkali metal hydroxide and convert the meta-chlorophenol sulfonic acid dialkali metal salt to the corresponding meta-chlorophenol sulfonate, i. e. meta-chlorophenol sulfonic acid monoalkali metal salt. The aqueous acidic solution containing the meta-chlorophenol sulfonate is then heated, preferably in admixture with sulfuric acid, at elevated temperatures to effect the acidic hydrolysis of the sulfonate group and form meta-chlorophenol as hereinbefore described. The meta-chlorophenol is recovered from the aqueous acidic hydrolysis mixture in usual ways, e. g. by distillation from the aqueous acidic hydrolysis mixture together with water as it is formed, or by extraction of the acidic hydrolysis mixture with a water-immiscible organic solvent such as benzene, toluene, ethylbenzene or chlorobenzene. The solvent is separated from the meta-chlorophenol in usual ways, e. g. by distillation.

The following examples illustrate ways in which the principle of the invention has been applied, but are not to be construed as limiting its scope.

EXAMPLE 1

A charge of 294 grams of isomeric dichlorobenzenes, consisting of 6.1 percent by weight of o-dichlorobenzene, 55.8 percent of m-dichlorobenzene and 38.1 percent of p-dichlorobenzene by analysis, was placed in a glass vessel equipped with a stirrer and reflux condenser. It was stirred and maintained at temperatures between 28° and 65° C. while adding 90 grams of sulfur trioxide over a period of 45 minutes. Thereafter, the mixture was diluted with 200 cc. of water. The resulting mixture was transferred to a distilling flask and heated to distill unsulfonated dichlorobenzenes, together with water from the mixture, the water being separated from the distillate and returned to the distilling flask during the process. There was obtained 157.5 grams of dichlorobenzene having a freezing point of 42° C. One-half of the aqueous residue solution remaining in the distilling flask and containing the meta-dichlorobenzene sulfonic acid was mixed with 66 grams of sodium hydroxide and 330 grams of water. The resulting aqueous mixture was heated in an iron bomb with agitation at temperatures between 195° and 204° C. under the autogenous pressure of the materials for a period of 1.25 hours, then cooled and removed from the bomb. To this aqueous mixture was added 274 grams of concentrated (98%) sulfuric acid with stirring. The acidic aqueous mixture was heated to boiling at atmospheric pressure to distill water and the chlorophenol therefrom. When the mixture in the still pot reached a temperature of 140° C., chlorophenol together with water was separated as distillate. Substantially all of the chlorophenol was azeotropically distilled with water at pot temperatures between 140° and 160° C. at atmospheric pressure. There was obtained 41.6 grams of chlorophenol. The product was principally m-chlorophenol.

EXAMPLE 2

Sulfonation of dichlorobenzenes

A charge of 2360 grams of dichlorobenzenes consisting of about 66.5 percent by weight of m-dichlorobenzene, 1.5 percent of o-dichlorobenzene and 32 percent of p-dichlorobenzene was placed in a glass reaction vessel equipped with a reflux condenser and stirrer. It was stirred. A charge of 580 grams of sulfur trioxide was added over a period of 4 hours while stirring and maintaining the mixture at temperatures between 30° and 40° C. Thereafter, 2700 cc. of water was added slowly with stirring, after which the mixture was allowed to stand. The aqueous and organic layers were separated. The aqueous solution weighed 4035 grams and contained 6.46 gram moles of dichlorobenzene sulfonic acid, 0.25 gram mole of dischlorobenzene disulfonic acid and 0.15 gram mole of sulfuric acid. The aqueous solution was neutralized with an aqueous 47.5 weight percent solution of sodium hydroxide.

EXAMPLE 3

Hydrolysis of meta-dichlorobenzene sulfonic acid

A charge of 20,082 grams of a neutralized aqueous solution containing 28.87 gram moles of sulfonated meta-dichlorobenzene, prepared by procedure similar to that described in Example 2, was placed in an iron autoclave, together with 5,000 grams of an aqueous 49 weight percent solution of sodium hydroxide. The mixture was agitated and heated at temperatures between 220° and 230° C. under the autogenous pressure of the materials for a period of 1.5 hours, then cooled and removed from the autoclave. A portion of the mixture was analyzed. The aqueous mixture contained 27.97 gram moles of sodium meta-chlorophenol sulfonate.

EXAMPLE 4

Preparation of meta-chlorophenol

A charge of 8.24 kilograms of concentrated sulfuric acid was diluted with 5.5 kilograms of water. The mixture was placed in a glass vessel equipped with a stirrer, an inlet and a short distilling column. The mixture was stirred and heated to a temperature of 140° C. Thereafter, the aqueous solution containing sodium meta-chlorophenol sulfonate, prepared in Example 3 above, was fed into admixture with the aqueous sulfuric acid with stirring while maintaining the resulting mixture at temperatures between 140° and 150° C. and distilling water together with meta-chlorophenol from the reaction mixture at about the rate the latter was formed. The distillate was collected. The aqueous and chlorophenol layers were separated. The aqueous layer was extracted with chlorobenzene. The chlorobenzene extract was combined with the chlorophenol layer from the distillate and the combined material was distilled to recover the chlorophenol. There was obtained 26.5 grams of ortho-chlorophenol, 53.7 grams of an intermediate fraction consisting of a mixture of ortho- and meta-chlorophenol, 2929.6 grams of meta-chlorophenol boiling at temperatures between 148° and 148.7° C. at 100 millimeters absolute pressure and 51.7 grams of residue. The meta-chlorophenol boiling at 148–148.7° C. at 100 millimeters consisted of 0.5 percent by weight of ortho-chlorophenol, 2.5 percent para-chlorophenol and 97.0 percent meta-chlorophenol, by analysis.

EXAMPLE 5

A charge of 201.3 grams of an alkaline aqueous solution containing 0.172 gram mole of sodium meta-chlorophenol sulfonate, 0.174 gram mole of sodium chloride and 0.146 gram mole of sodium hydroxide, prepared by procedure similar to that described in Example 3, was mixed with 67.9 grams of concentrated (98%) sulfuric acid. The acidic mixture was heated in an alloy steel bomb (Hastelloy B) at a temperature of 180° C., with agitation for a period of 0.5 hour, then cooled and removed from the bomb. It was mixed with chlorobenzene and the aqueous and organic layers separated. The organic layer was distilled to recover the meta-chlorophenol. The yield of meta-chlorophenol was substantially quantitative.

In a similar experiment wherein a like charge of the aqueous solution of the sodium meta-chlorophenol sulfonate and sulfuric acid was heated under pressure at a temperature of 160° C. for 0.5 hour, the yield of meta-chlorophenol was 91.9 percent.

EXAMPLE 6

To a charge of 250 grams of a batch of an aqueous alkaline hydrolysis reaction mixture containing 69.5 grams (0.275 mole) of meta-chlorophenol sulfonic acid disodium salt, 4 grams of sodium hydroxide and 17.3 grams of sodium chloride, prepared by heating meta-dichlorobenzene sulfonic acid sodium salt in admixture with an aqueous solution of sodium hydroxide at elevated temperatures and pressures, there was added 80.8 grams of 95 percent sulfuric acid. The mixture was heated in an alloy metal Hastelloy B bomb at a temperature of 140° C. for a period of one hour, then cooled. The aqueous mixture was removed from the bomb and mixed with chlorobenzene. The aqueous and organic layers were separated. The organic layer was distilled to recover the metal-chlorophenol. There was obtained 6.5 grams of metal-chlorophenol. The yield of meta-chlorophenol was 18.4 percent.

EXAMPLE 7

To a charge of 250 grams of the batch of the aqueous alkaline hydrolysis reaction mixture containing 69.5 grams (0.275 mole) of meta-chlorophenol sulfonic acid disodium metal salt described in Example 6, there was added 47.5 grams of 95 percent sulfuric acid. The acidic mixture was placed in a Hastelloy B metal bomb and was agitated and heated at a temperature of 180° C. for a period of one hour under the autogenous pressure of the materials, then cooled to room temperature. The aqueous mixture was removed from the bomb and was mixed with chlorobenzene. The aqueous and organic layers were separated. The organic layer was distilled to separate the chlorobenzene and recover the meta-chlorophenol product. There was obtained 26.8 grams (0.208 mole) of meta-chlorophenol. The yield of meta-chlorophenol was 76 percent based on the meta-chlorophenol sulfonic acid disodium salt initially used.

EXAMPLE 8

*Preparation of m-dichlorobenzene sulfonic acid*

A. A charge of 3169 grams of isomeric dichlorobenzenes, consisting of 58 percent by weight of m-dichlorobenzene and 42 percent of p-dichlorobenzene, was placed in a glass reaction vessel equipped with a stirrer and reflux condenser. It was stirred and maintained at temperatures between 30° and 60° C. while adding 728 grams (9.1 moles) of sulfur trioxide to the liquid over a period of 15 hours. Thereafter, 2,000 ml. of water was added and after standing the aqueous and organic layers were separated. The organic layer was distilled. There were obtained 1920 grams of a dichlorobenzene fraction consisting of 33.5 percent by weight of m-dichlorobenzene and 66.5 percent of p-dichlorobenzene. The aqueous layer weighed 4694 grams and contained 1845.5 grams (8.13 moles) of m-dichlorobenzene sulfonic acid and 30.4 grams of sulfuric acid.

*Preparation of m-chlorophenol sulfonate*

B. A charge of 1006 grams of the aqueous solution containing m-dichlorobenzene sulfonic acid prepared in part A above and 476 grams of an aqueous 48.8 weight percent solution of sodium hydroxide was placed in an iron bomb. The mixture was agitated and heated at temperatures between 200° and 220° C. under the autogenous pressure of the mixture for a period of 2.5 hours, then was cooled to room temperature. The bomb was opened and its contents removed. The aqueous alkaline hydrolysis solution was analyzed and found to contain m-chlorophenol sulfonic acid disodium salt in amount corresponding to a yield of 96.4 percent of said product based on the m-dichlorobenzene sulfonic acid starting material.

*Preparation of m-chlorophenol*

C. A charge of 200 grams of the aqueous alkaline solution containing m-chlorophenol sulfonic acid disodium salt prepared in part B above and 125 grams of an aqueous 36 weight percent solution of hydrochloric acid was placed in a Hastelloy B metal bomb. The mixture was agitated and heated at temperatures between 200° and 203° C. under the autogenous pressure of the materials over a period of 0.5 hour, then was cooled to room temperature. The bomb was opened and the contents removed. The aqueous acidic hydrolysis solution was analyzed and found to contain m-chlorophenol in amount corresponding to a yield of 81 percent based on the m-chlorophenol sulfonic acid disodium salt starting material.

We claim:

1. A process for making meta-chlorophenol which comprises treating a mixture of isomeric dichlorobenzenes comprised essentially of a mixture of isomeric meta- and para-dichlorobenzenes with a sulfonating agent selected from the group consisting of fuming sulfuric acid, chlorosulfonic acid and sulfur trioxide, at temperatures between 20° and 80° C. and in amount corresponding to from 0.6 to 1 gram molecular proportion of the sulfonating agent per gram molecular proportion of the meta-dichlorobenzene to obtain meta-dichlorobenzene sulfonic acid, separating the meta-dichlorobenzene sulfonic acid from the unsulfonated dichlorobenzenes, converting the meta-dichlorobenzene sulfonic acid to its alkali metal salt and heating the meta-dichlorobenzene sulfonate in admixture with an aqueous alkali metal hydroxide solution in concentrations of from 2 to 25 percent by weight and in amount corresponding to from 2 to 4 gram molecular proportions of the alkali metal hydroxide per gram molecular proportion of the meta-dichlorobenzene sulfonate starting material at reaction temperatures between 180° and 240° C. under a pressure at least as great as the autogenous pressure of the mixture of the materials to obtain meta-chlorophenol sulfonate and heating the meta-chlorophenol sulfonate in admixture with a liquid aqueous acidic solution containing an acid selected from the group consisting of hydrochloric, hydrobromic and sulfuric acids in amount corresponding to at least 0.5 gram molecular proportion of the acid per gram molecular proportion of the meta-chlorophenol sulfonate at reaction temperatures between 120° and 250° C. and under an absolute pressure sufficient to maintain a major portion of the aqueous solution in liquid condition whereby the meta-chlorophenol sulfonate is hydrolyzed to meta-chlorophenol and separating meta-chlorophenol from the acidic hydrolysis solution.

2. A process as claimed in claim 1, wherein the meta-chlorophenol sulfonate is heated at temperatures between 160° and 220° C. in admixture with a liquid aqueous solution containing sulfuric acid in a concentration between 5 and 20 percent by weight.

3. A process as claimed in claim 1, wherein the meta-chlorophenol sulfonate is heated at temperatures between 160° and 220° C. in admixture with a liquid aqueous solution containing hydrochloric acid in a concentration between 5 and 20 percent by weight.

4. A process for making meta-chlorophenol which comprises bringing a sulfonating agent selected from the group consisting of fuming sulfuric acid, chlorosulfonic acid and sulfur trioxide, into contact with a liquid material comprised essentially of a mixture of meta- and para-dichlorobenzenes at reaction temperatures between 20° and 80° C. and in amount corresponding to from 0.6 to 1 gram molecular proportion of the sulfonating agent per gram molecular proportion of the meta-dichlorobenzene to obtain meta-dichlorobenzene sulfonic acid, separating the meta-dichlorobenzene sulfonic acid from the unsulfonated dichlorobenzenes, converting the meta-dichlorobenzene sulfonic acid to its alkali metal salt and hydrolyzing the meta-dichlorobenzene sulfonic acid alkali metal salt by heating said alkali metal salt of the meta-dichlorobenzene sulfonic acid in admixture with an aqueous alkali metal hydroxide solution in concentrations between 2 and 25 percent by weight and in amount corresponding to from 2 to 4 gram molecular proportions of the alkali metal hydroxide per gram molecular proportion of the meta-dichlorobenzene sulfonic acid alkali metal salt starting material at temperatures between 180° and 240° C. under a pressure at least as great as the autogenous pressure of the mixture of the materials to obtain meta-chlorophenol sulfonic acid dialkali metal salt, feeding the aqueous alkaline hydrolysis liquor containing the meta-chlorophenol sulfonic acid dialkali metal salt into admixture with an aqueous liquid containing sulfuric acid in concentration between 50 and 70 weight percent of the sulfuric acid maintained at a boiling temperature between 140° and 160° C. at atmospheric pressure whereby the meta-chlorophenol sulfonic acid dialkali metal salt is converted to meta-chlorophenol, and distilling meta-chlorophenol, together with water, from the resulting acidic reaction mixture.

5. A process as claimed in claim 4, wherein the sulfonating agent is sulfur trioxide.

6. A process as claimed in claim 4, wherein the alkali metal hydroxide is sodium hydroxide.

7. In a process for the production of dichlorobenzenes from chlorine and benzene wherein a mixture of isomeric ortho-, meta- and para-dichlorobenzenes is subjected to fractional distillation to obtain the meta- and para-dichlorobenzenes as distillate and separate them from the ortho-dichlorobenzene, and wherein the distillate comprising essentially a mixture of meta- and para-dichlorobenzenes is subjected to cooling at temperatures between 50° and −25° C., whereby at least a portion of the para-dichlorobenzene is crystallized and is separated from the liquid material, the steps which consist in treating the remaining liquid material at temperatures between 20° and 80° C. with a sulfonating agent selected from the group consisting of fuming sulfuric acid, chlorosulfonic acid and sulfur trioxide, in amount corresponding to from 0.6 to 1 gram molecular proportion of the sulfonating agent per gram molecular proportion of meta-dichlorobenzene in the liquid material to obtain meta-dichlorobenzene sulfonic acid, separating the meta-dichlorobenzene sulfonic acid from the unsulfonated dichlorobenzenes, purifying the latter and returning the recovered unsulfonated dichlorobenzenes to the cooling step, hydrolyzing the meta-dichlorobenzene sulfonic acid by heating an alkali metal salt of the meta-dichlorobenzene sulfonic acid in admixture with an aqueous alkali metal hydroxide solution in concentrations between 2 and 25 percent by weight and in amount corresponding to from 2 to 4 gram molecular proportions of the alkali metal hydroxide per gram molecular proportion of the meta-dichlorobenzene sulfonic acid alkali metal salt starting material at temperatures between 180° and 240° C. under a pressure at least as great as the autogenous pressure of the mixture of the materials to obtain meta-chlorophenol sulfonate, heating the meta-chlorophenol sulfonate in admixture with a liquid aqueous solution containing sulfuric acid in concentrations between 5 and 70 percent by weight of the sulfuric acid and in amount corresponding to at least 0.5 gram molecular proportion of the sulfuric acid per gram molecular proportion of the meta-chlorophenol sulfonate at reaction temperatures between 120° and 250° C. and under an absolute pressure sufficient to maintain a major portion of the aqueous solution in liquid condition to produce meta-chlorophenol and separating the meta-chlorophenol from the aqueous acidic mixture.

8. A process as claimed in claim 7, wherein the sulfonating agent is sulfur trioxide.

9. A process as claimed in claim 7, wherein the alkali metal hydroxide is sodium hydroxide.

References Cited in the file of this patent
UNITED STATES PATENTS

| | | |
|---|---|---|
| 1,421,869 | Von Bramer | July 4, 1922 |
| 2,523,707 | Miller | Sept. 26, 1950 |

OTHER REFERENCES

Groggins et al. "Unit Processes in Organic Synthesis," 4th ed. (1952), page 312 (1 page) publ. by McGraw-Hill Book Co., New York.